US008213357B2

(12) United States Patent
Hughes et al.

(10) Patent No.: US 8,213,357 B2
(45) Date of Patent: Jul. 3, 2012

(54) STATIC ADDRESSING OF DEVICES IN A DYNAMICALLY ROUTED NETWORK

(75) Inventors: Sterling Hughes, San Mateo, CA (US); Jana van Greunen, Redwood City, CA (US); Prashant Rathi, Mountain View, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 820 days.

(21) Appl. No.: 12/335,420

(22) Filed: Dec. 15, 2008

(65) Prior Publication Data

US 2010/0150059 A1 Jun. 17, 2010

(51) Int. Cl.
*H04W 4/00* (2009.01)
(52) U.S. Cl. .................. 370/328; 370/330; 370/508
(58) Field of Classification Search .......... 370/328–330, 370/508
See application file for complete search history.

(56) References Cited

U.S. PATENT DOCUMENTS

| | | | | |
|---|---|---|---|---|
| 5,774,876 | A * | 6/1998 | Woolley et al. | 705/28 |
| 2006/0161578 | A1 * | 7/2006 | Siegel et al. | 707/102 |
| 2007/0192506 | A1 | 8/2007 | Gupta et al. | |
| 2008/0144587 | A1 | 6/2008 | Gupta et al. | |
| 2008/0298382 | A1 * | 12/2008 | Galli et al. | 370/438 |

OTHER PUBLICATIONS

European Office Action, dated Dec. 1, 2010.
International Search Report and Written Opinion, dated Mar. 10, 2010.

* cited by examiner

*Primary Examiner* — Phuc Tran
(74) *Attorney, Agent, or Firm* — Buchanan Ingersoll & Rooney PC

(57) ABSTRACT

A method of routing in a network includes dividing a time corresponding to a predetermined maximum registration age of a first node registered with a second node into a number of first time intervals and second time intervals. The first time intervals each have a predetermined duration and the second time intervals each have a duration greater than the predetermined duration of the first time intervals. Each of the first and second time intervals are assigned a metric designating a cost associated with a path between the first node and the second node. The metric increases in value for each of the first and second time intervals as registration age increases. The second node sends a message including the metric associated with the time interval during which it is transmitted.

35 Claims, 3 Drawing Sheets

STATIC ADDRESSING OF DEVICES IN A DYNAMICALLY ROUTED NETWORK

BACKGROUND

1. Field of the Invention

The subject matter presented herein relates generally to the field of communications networks, and more particularly, to wireless mesh networks.

2. Description of Related Art

Mesh networks have proven very successful, and many examples of large, geographically distributed networks exist. The architecture of these networks typically supports a process control model where there are just a few nodes, known as access points (APs) or gateways, which provide access into and egress from the mesh network. A multiplicity of endpoint nodes in the mesh network can be accessed from these access point entry nodes. Requests and commands may be sent through APs, and responses and acknowledgements may be returned through them. More generally, any node in an ad-hoc wireless network may be used as routing proxy to access or communicate with one or more other nodes in the network.

In one example, electric utility companies have been using mesh networks to automate the operation of the electric power distribution grid to provide a higher level of reliability and operational and maintenance efficiency. In many cases, substations can be largely automated, but distributed feeders may be much less automated.

The SCADA (Supervisory Control and Data Acquisition) system is an example of a system that can monitor and control distribution grid elements (e.g., switches, transformers, substations, feeders) via remote terminal units (RTUs) as part of a Distribution Automation (DA) network. Distribution Automation involves the remote monitoring of an electrical power distribution system and facilitates supervisory control of devices. DA also provides decision support tools to improve system performance.

SCADA back-office systems are typically designed to use static IP addresses to address DA equipment (capacitor bank controllers, switch reclosures, substation equipment, feeders, etc). These DA devices may be connected to the utility network via an Ethernet bridge (ebridge). The ebridges may be nodes in the wireless utility network with the egress point provided by one or more gateways or APs. The APs can connect to the back office server via a WAN.

The ebridges may find a route to an AP and obtain an IP address from the AP, for example, by using an IPv6 prefix with a MAC address combination or via Dynamic Host Configuration Protocol (DHCP) in IPv4 networks. When an ebridge obtains an IP address, it publishes a Domain Name System (DNS) record with its MAC address as the name. This allows a back-office system to resolve the IP address for a particular ebridge MAC address.

The use of dynamic IP addresses in a network allows a utility network to be divided into segments by subnet. For example, each AP may be assigned to a subnet. Thus, there may not be a need to publish any additional routing information. As devices join the network, these devices may be automatically reachable, as their dynamic IP addresses are in the same subnet. However, as mentioned, SCADA systems may only be configured to communicate with DA devices that have static IPv4 addresses.

Thus, a challenge is to find a dynamic route to a statically addressed DA device if the ebridge to which it is attached joins different networks due to changes in Layer 2 connectivity. Layer 2, i.e., the Data Link Layer, is one of the layers in the seven-layer OSI model. It responds to service requests from the Network Layer and issues service requests to the Physical Layer.

An ebridge may at any time choose a different AP than the one it is presently using for egress. When an ebridge joins an AP's network, the AP publishes routing information for the statically configured node attached to the ebridge. These routing advertisements preferably adhere to a standard protocol so that off-the shelf routers will work within the utility network system.

One example of providing routing advertisements is through the use of the Routing Information Protocol (RIP). RIP may be used because it is relatively simple to implement and may be supported by many routers. RIP is a distance-vector routing protocol that uses a "hop" count as a routing metric. A hop is the trip a data packet takes from one router or intermediate point to another in the network. The maximum number of hops allowed with RIP is 15. The metric (hop) field includes values from 0 to 14. That is, if the AP advertises a hop count of 15, the router will add one to that number and advertise a metric of 16, which designates an unreachable destination.

In a utility network, ebridges may switch APs if a second AP's Layer 2 routing cost, i.e. the sum of the costs of the links between the nodes used, becomes lower than its current primary AP, or it loses its route to its current AP. The nodes can typically register with an AP for a period of eight hours. Re-registration normally takes place at the expiration of the registration period. However, a node may switch to an alternate AP and register with it at any time by sending a registration message to the new AP. The registration message may cause the node to be configured with an IPv6 address. The registration message also notifies the AP of any devices with static IPv4 addresses that are connected to that ebridge.

When an ebridge switches APs, e.g., it switches from AP 1 to AP 2, the ebridge may not be able to send AP 1 a message that it is no longer using it. For example, the ebridge may have lost all routes to AP 1. A problem now arises in that both APs think the ebridge is registered with them, thus creating a registration ambiguity. In a network with nodes that employ dynamic IP addresses, the DNS server is typically able to resolve this problem. However, in this example, the SCADA system is not using DNS, and the IP address of the device connected to the ebridge is static, so a DNS lookup may not solve the problem. In addition, both APs continue to publish RIP updates for the device connected to the ebridge.

SUMMARY

The methods and systems disclosed herein provide a solution to eliminating a registration ambiguity associated with DA devices having static IP addresses in a network with multiple APs, such as a utility network for Distribution Automation. In an exemplary embodiment, a period of time, corresponding to registration of a first node with a second node, is divided into a sequence of time intervals, wherein a time interval at the beginning of the period of time has a duration that is shorter than a time interval that is later in the period of time. Each of the time intervals is assigned a metric designating a cost associated with a communications path between the first node and the second node. The designated cost increases in value for successive intervals of time in the sequence. The second node broadcasts at least one message during each of the time intervals, which message contains the metric associated with time interval during which the message is broadcast.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

The methods and systems described herein generally pertain to mesh networks in which two-way communications take place between a sending, or source, node and a receiving, or destination, node. Exemplary networks may include wireless networks such as frequency-hopping spread spectrum (FHSS) networks. To facilitate an understanding of the principles described herein, reference is made to an example in which one or more APs in a network advertise that a node is registered with them, and include a RIP metric with such advertisement. As discussed previously, however, the disclosed technique can be performed by other nodes in a network as well. A method is provided for modifying RIP metrics to reflect an underlying dynamic network that might employ static IP addresses. In other words, the method disclosed herein can modify the RIP metric in order to extend the reachability and connectivity of a node, which may route through different networks depending on the Layer 2 connectivity.

Figure 1:
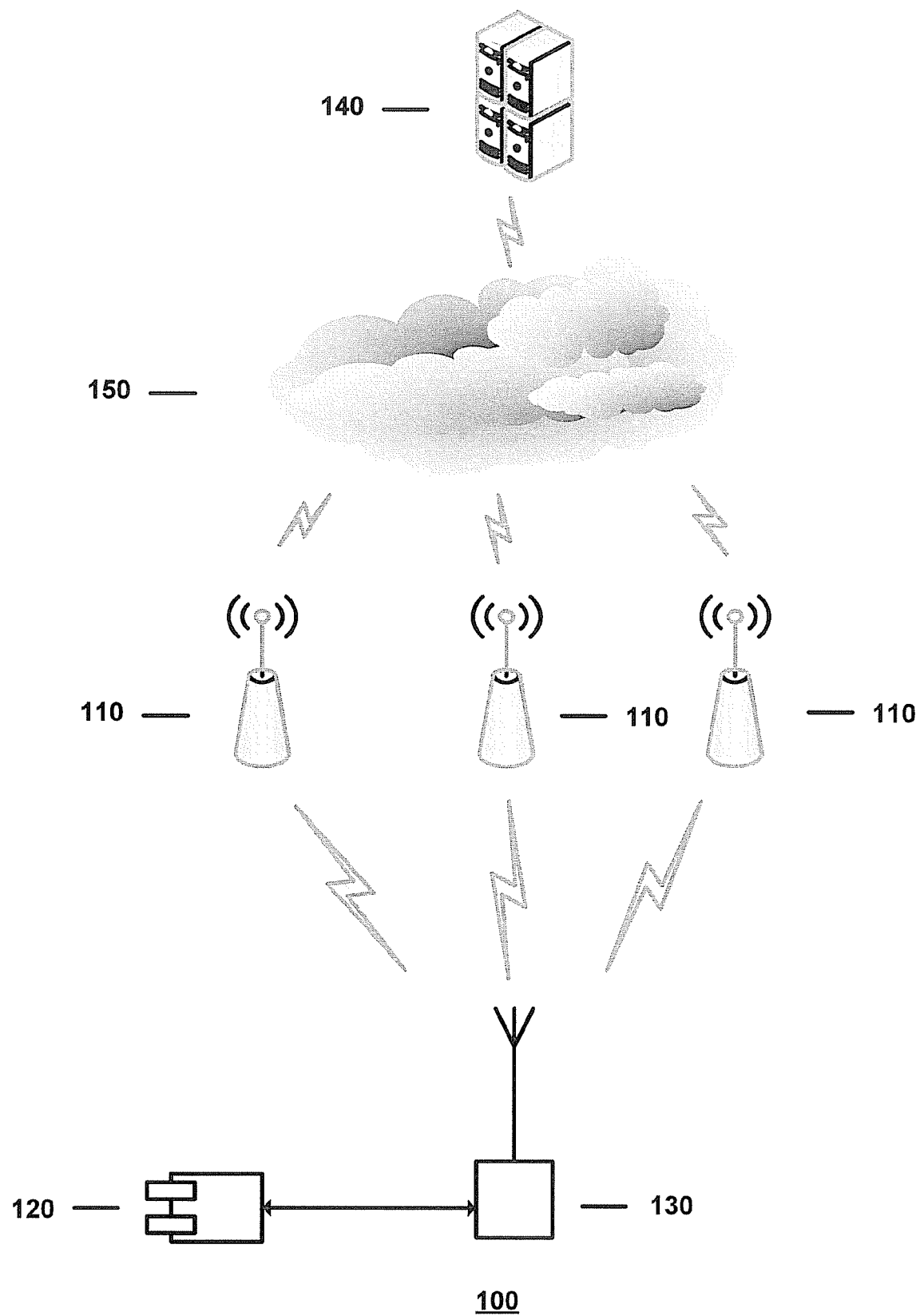
FIG. 1 shows an exemplary representation of a utility network with multiple APs and a DA device.

FIG. 1 is a simple representation of an exemplary utility network 100 with multiple APs 110 and a DA device 120. The DA device 120 may be connected to the utility network 100 via an Ethernet bridge (ebridge) 130. An ebridge 130 may be a node in the wireless utility network 100 with an egress point provided by one or more gateways or APs 110. The APs 110 can connect to a back office server 140 via a WAN 150.

As briefly mentioned above, the Routing Information Protocol (RIP) is a routing protocol that uses distance vectors to mathematically compare routes to identify the best path to a given destination address. The IETF RFCs 1388 and 1723 describe the IP-based functional features of the RIP protocol.

RIP routing update messages can be sent at regular intervals and when the network topology changes. When a router receives a routing update that includes changes to an entry, it updates its routing table to reflect the new route. RIP routers typically maintain only the best route, that is, the route with the lowest metric value, to a destination. After updating its routing table, the router begins transmitting routing updates to inform other network routers of the change. These updates may be sent independently of the regularly scheduled updates that RIP routers send.

In an embodiment, RIP can be implemented as a multicast protocol. That is, all APs 110 can hear each other's RIP announcements. When an AP 110 hears a RIP advertisement with a lower metric for a particular static IPv4 address than its own metric for that address, it will stop advertising for that address.

As mentioned above, RIP typically uses a single routing metric (hop count) to measure the distance between the source and a destination in a network. Each hop in a path from source to destination may be assigned a hop count value, which is typically 1. For example, when a router receives a routing update that contains a new or changed destination network entry, the router adds 1 to the metric value indicated in the update and enters the network information in the routing table. The IP address of the sender can be used as the next hop. In an embodiment, an AP can be the sender. More generally, a sender can be any entity that broadcasts routing-related information, e.g., path cost updates, registration updates, etc.

RIP can prevent routing loops from continuing indefinitely by implementing a limit on the number of hops allowed in a path from the source to a destination. The maximum number of hops in a path is typically 15. If a router receives a routing update that contains a new or changed entry, and if increasing the metric value by 1 causes the metric to reach infinity, in this case 16, the network destination is considered unreachable. A limitation of this stability feature is that it limits the maximum range of a RIP network to less than 16 hops.

RIP can use several timers to regulate its performance. These include, for example, a routing-update timer, a route-timeout timer, and a route-flush timer. The routing-update timer can time the interval between periodic routing updates. Generally, it is set to 30 seconds, with a small random amount of time added whenever the timer is reset. This is done to help prevent congestion, which could result from all routers simultaneously attempting to update their neighbors.

Each routing table entry can also have a route-timeout timer associated with it. When the route-timeout timer expires, the route is marked invalid but is retained in the table until the route-flush timer expires.

In a dynamically routed network having devices with static IP addresses, such as DA devices, a challenge involves the minimization of conflicts between APs. As discussed in detail hereinafter, the RIP metric is modified to achieve such an objective. To this end, the RIP metric is set to be proportional to the elapsed time since a node, such as an ebridge, registered with the AP. For example, if an ebridge registers with AP 1 at 1 pm, and with AP 2 at 2 pm, for a RIP advertisement sent at 2:01 pm, it would be preferable to have AP 1's RIP metric higher than AP 2's. If AP 1's RIP metric is higher, that means that it has a lower quality route to the destination IP address, and the router will prefer AP 2 with the lower metric (and most recent registration).

As mentioned above, nodes can typically register with an AP for a period of eight hours. One way to minimize conflict between APs is to divide the eight-hour registration period into segments and have the APs increment their RIP metrics when the time since registration increases into a new segment. Assuming that the segments are of equal time, since there can be 16 values (metric 0 to 15), that would mean the APs could increment their metrics every half hour. One result here is that if an ebridge registers with one AP, and then switches to a second AP after a minute, the DA device associated with the ebridge may be potentially unreachable for twenty-nine minutes because for that time both APs are advertising the same metric.

In another embodiment, the segments between the registration periods may be based on a metric other than hop count that relates to network conditions and DA device population.

Nevertheless, there is a possibility that the conflict will never be resolved due to a race condition that may occur due to propagation delays on the multicast RIP message. For example, in the scenario where an ebridge registers with AP 1, and then switches to AP 2 within 10 seconds, if the propagation delay for AP 1's RIP advertisement is one second on the WAN, but the propagation delay for AP 2's RIP advertisement is 11 seconds or longer, then the two APs may be advertising the same RIP metric for the entire eight hour registration period. Moreover, if AP 2's delay is longer than 10 seconds, then AP 2 may hear the message from AP 1, think that AP 1 has a lower metric, and stop advertising. In this case, the device behind the ebridge may be unreachable for eight hours. In order to avoid these race conditions, the minimum time between network registrations for ebridges can be configurable. For each deployment scenario, the minimum time between network registrations may be preferably set to double the maximum propagation delay on the WAN. This embodiment may help to eliminate race conditions.

The above discussion shows that the frequency at which the APs increment their metric can be a factor in how long a device may be unreachable. For example, AP 1 and AP 2 may advertise the same RIP metric at the same time and increment their RIP metric every ten minutes that the registration ages, i.e., 0-10 min results in a RIP metric of 0, 10-20 min results in a RIP metric of 1, 20-30 min results in a RIP metric of 2, and so on until RIP metric 14 is reached. At that time, the RIP metric stays at 14 until the end of the eight-hour registration period is reached or the node registers again.

In another example, AP 2's registration may be one minute more recent than AP 1's registration. In this case, nine minutes may pass before AP 1 increments its metric and determines that it is really an older registration, at which point it stops advertising. Thus, a small window for incrementing the RIP metric may be preferable to minimize the time it takes a node to become reachable. RIP metrics may be sent every 30 seconds to one minute, so that timing may determine the minimum time that the AP may use to increment its metric.

Additionally, the first period after registration may have greater importance because if AP 1's metric is already greater than 0 when the ebridge switches to AP 2, then AP 1 may immediately stop advertising. However, it may not be preferable to make only the first window for incrementing the metric short and make the rest of the windows (for incrementing between metrics 1 and 14) long because there may be a chance that the AP's WAN could become inoperative during this time, or that the message could be dropped. In addition, if all windows are short, e.g., the AP increments its cost from 0-14 in fourteen minutes, then if an AP's WAN is inoperative for 15 minutes and the ebridge is switched, there may be a conflict for up to eight hours.

Accordingly, in an exemplary embodiment, the frequency at which the AP increments its RIP metric may be varied over the course of a registration period so that the metric is incremented at a faster rate early in the period and at a slower rate later in the period. To do so, the registration period may be divided into a number of time intervals, and each interval is assigned a respective duration and a successively increasing metric value. In one exemplary embodiment, a period of time corresponding to a predetermined maximum registration age of a first node, e.g. an ebridge, that registers with a second node, e.g. an AP, may be divided into a number of first time intervals n and a number of second time intervals x, totaling a number z of time intervals. The first time intervals n may each have a predetermined duration, and the second time intervals x may each have a duration greater than the predetermined duration of the first time intervals n.

In an exemplary embodiment, the second time intervals x may each have an equal duration determined by ((predetermined maximum registration age in minutes)−(n*predetermined time interval in minutes))/(z−n). Table 1, below, shows an example of how the RIP metric can be incremented relatively quickly for n=6 initial intervals of one minute each, followed by 15−n (i.e., 9) longer intervals that evenly divide the remainder of the network registration period, i.e., 474 minutes (480 minutes minus 6 minutes), into equal lengths of time, i.e., 52.7 minutes (474 minutes divided by 9).

TABLE 1

| Registration Age (minutes) | Metric |
|---|---|
| 0-1 | 0 |
| 1-2 | 1 |
| 2-3 | 2 |
| 3-4 | 3 |
| 4-5 | 4 |
| 5-6 | 5 |
| 6-58.7 | 6 |
| 58.7-111.3 | 7 |
| 111.3-164 | 8 |
| 164-216.7 | 9 |
| 216.7-269.3 | 10 |
| 269.3-322 | 11 |
| 322-374.7 | 12 |
| 374.7-427.3 | 13 |
| 427.3-480 | 14 |

As shown, each of the first and second time intervals may be assigned a metric corresponding to a cost associated with the path from a given node to another node, e.g., between an AP and an ebridge. The metric may increase in value for each of the time intervals as registration age increases. During each time interval, the given node may send one or more messages that include the metric associated with that interval.

Figure 2:
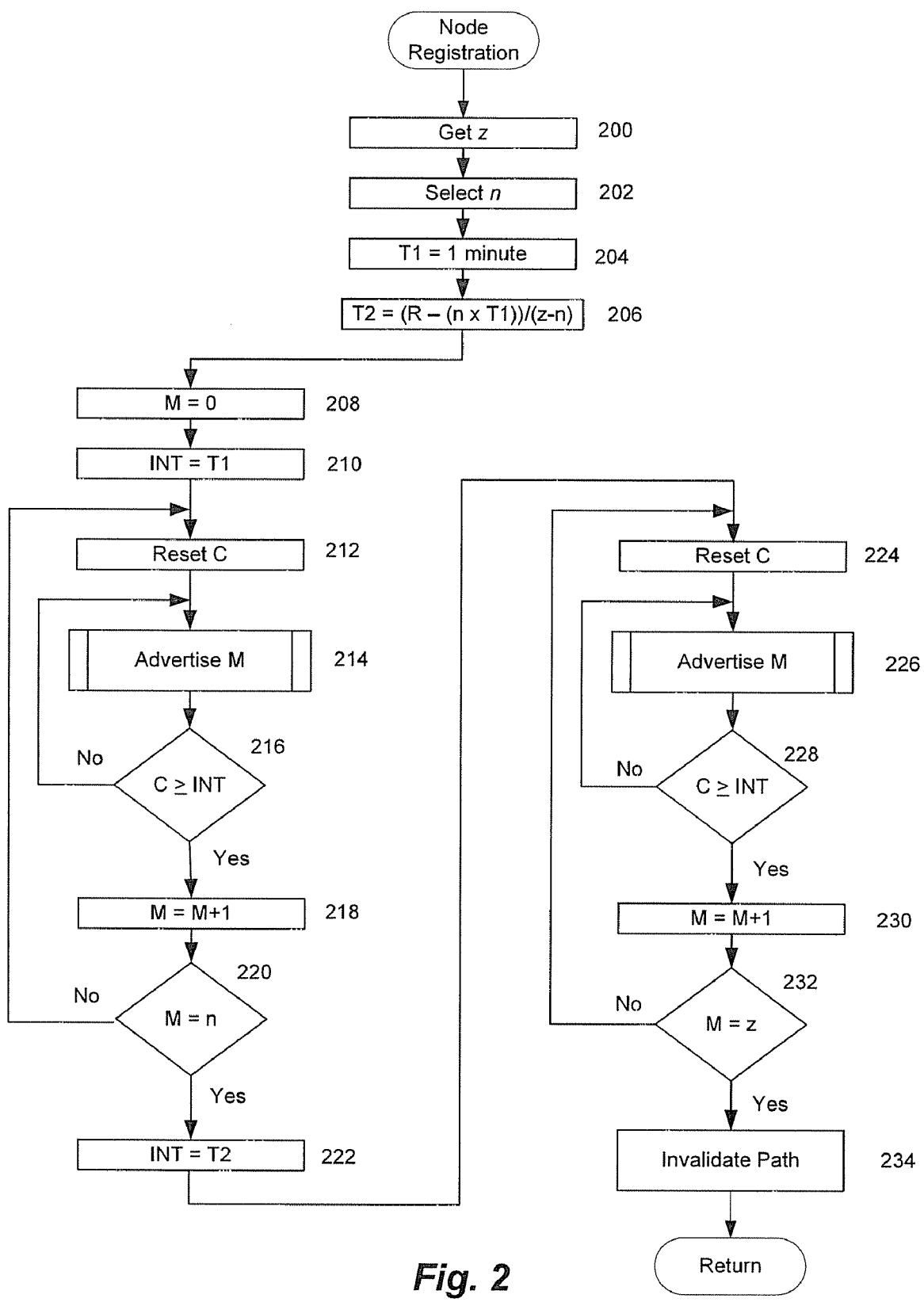
FIG. 2 is a flow chart showing one exemplary method of varying the frequency at which an AP increments its RIP metric.

FIG. 2 is a flow chart illustrating a process for implementing the foregoing exemplary embodiment. This process may be triggered when a node registers, or re-registers, with an AP. It may be performed at the AP, and the software and/or firmware necessary to execute the steps of the process may be persistently stored in a suitable computer-readable medium (not shown) in the AP, e.g. flash memory. This process may also be carried out by any other node in the network, including the endpoint node, that has the ability to act as a routing proxy. In the first few steps of the process, various values may be established and parameters may be initialized. At step 200, a value z for the total number of time intervals is obtained. In the foregoing example, where each successive interval may be associated with the next routing metric value, z is equal to the total number of allowable metric values, i.e. 15. At step 202, the value for n, the number of short time intervals, is obtained. This value might be a predetermined number that is stored at the AP, such as 6, or might be calculated each time the process is carried out, based on any desirable criteria.

At step 204, the length of each of the initial shorter intervals, T1, is set. In the foregoing example, this duration is set to one minute, but it could be any suitable value that is based upon network operating conditions, e.g. relative propagation delays, likely periods of time between successive registrations by a node, etc. At step 206, the duration T2 of each of the longer intervals is calculated, using the formula described above.

At step 208 the routing metric value is initially set to 0, and at step 210, the length INT of the current interval, in this case the initial interval, is set equal to T1. Steps 200-210 complete the initialization of the process, and the advertising of the routing metric is ready to begin.

At step 212, a timer, or counter, C is reset to zero, and begins to count forward. At step 214, the AP advertises the current routing metric value M for its path to the node, and then checks at step 216 whether the timer C has reached the value for INT. During the first iteration, therefore, a determination is made whether one minute has passed, in the context of the example described above. If the full duration of the current interval has not yet lapsed, the process returns to step 214 and continues to advertise the routing metric for its path to the node, at regularly scheduled times. For instance, as described previously, the advertisement may be broadcast every 30 seconds, based upon a routing-update timer that runs within the subroutine of step 214.

Once the amount of time for the current interval has lapsed, a check at step 216 will produce an affirmative result, and the process moves to step 218, where the value of the metric M is incremented. A determination is then made at step 220 whether the new value for M is equal to n. In other words, a check is made to see if n intervals have transpired since the registration of the node with the AP. If not, the process returns to step 212, and the AP begins a new interval to advertise its path to the node, with the new value for the routing metric M. Steps 212-220 are repeated in an iterative manner until n advertising intervals have transpired.

When an affirmative result is obtained at step 220, indicating that n intervals have transpired, the process moves to step 222. In this step, the duration INT of an interval is changed from the value of T1 to T2. Thereafter, steps 224-232 are carried out to continue to advertise the path to the node with an increased routing metric for each interval. In this case, however, the intervals are of greater duration. This process continues in an iterative manner until a determination is made at step 232 that the routing metric M is equal to z, i.e. the last interval for the registration period has been completed. At this point, the process moves to step 234, and invalidates the path to the corresponding node. The process then returns, and awaits a new registration by the node.

Figure 3A:
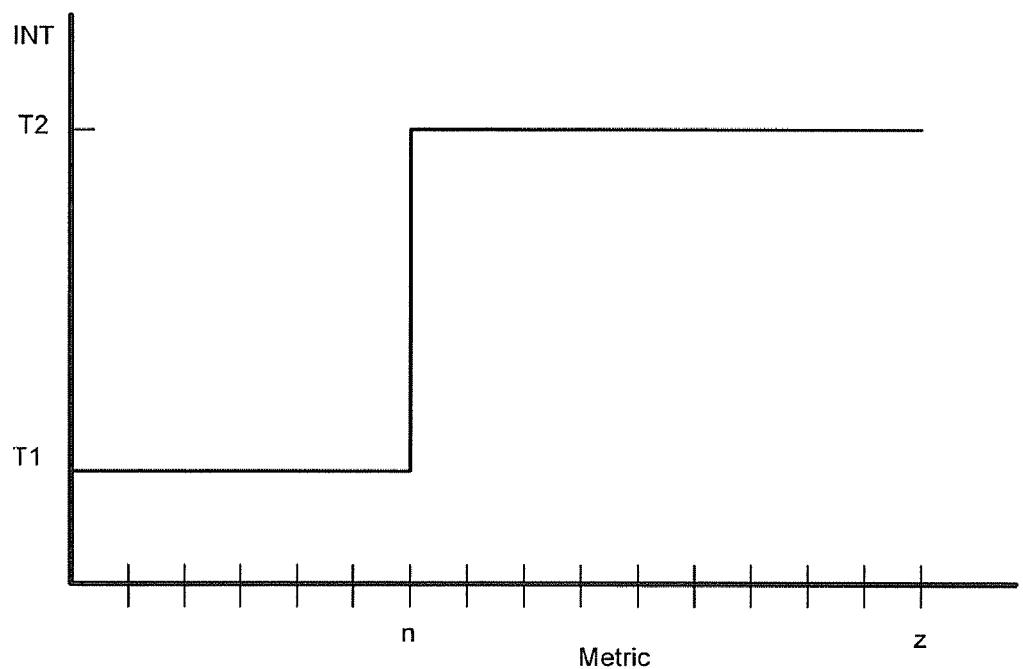
FIGS. 3A and 3B are graphs illustrating exemplary functions that can be used to determine the durations of the time intervals.

In the examples of Table 1 and FIG. 2, a step function is used to determine the length of the interval for each incremental value of the routing metric. Referring to FIG. 3A, the interval length is set to a first, predetermined value T1 for n intervals, and then increases to a second value T2 for the remainder of the z−n intervals in the registration period. It will be appreciated that this example is not the only possible implementation for achieving the desired results. In general, any function that produces a monotonic increase in the duration of the intervals between the beginning and end of the registration period might be used for this purpose. For instance, more than one step might be employed in the function that determines interval length, e.g. the first few intervals have a short duration, each of a second group of intervals has a slightly longer duration, and the last group of intervals have even longer durations.

Figure 3B:
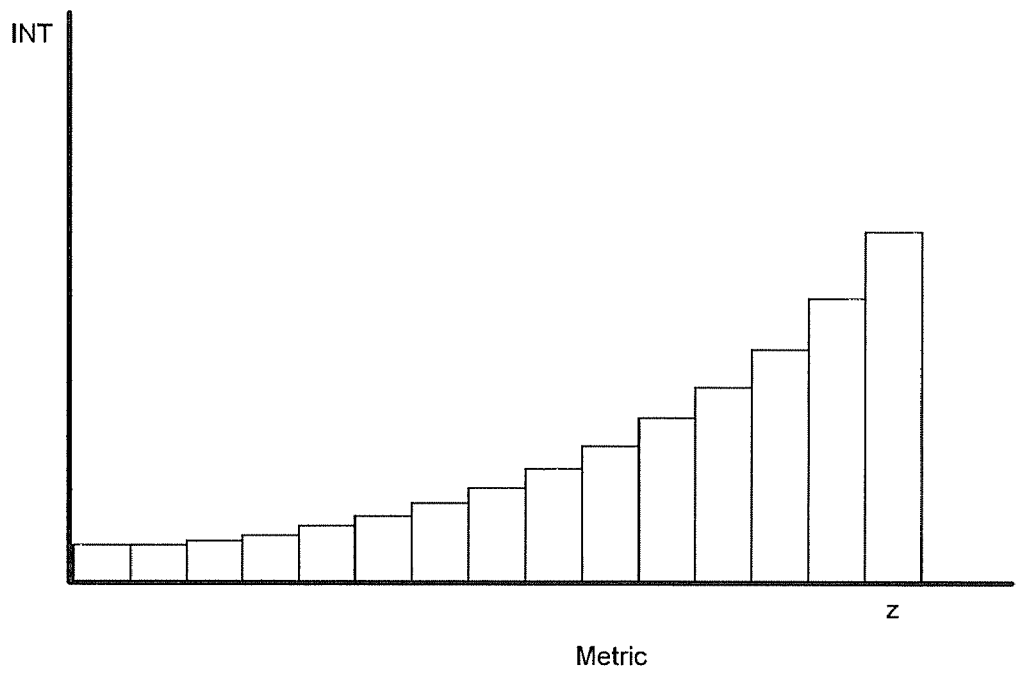

In another embodiment, the lengths of the intervals may increase in a progressive manner over the sequence of time intervals that span the registration period. For instance, each successive interval could be a certain amount longer than its predecessor. In a variation of this embodiment, the lengths of the intervals might increase in a nonlinear fashion, as shown in FIG. 3B. For instance, if the non-linearity corresponds to a parabolic function, the duration INT of the current interval can be calculated as $INT=aM^2$ for $M \neq 0$, where a is the duration of the first interval and is calculated so that sum of all of the intervals is equal to the length of the registration period. In another implementation of this embodiment, the durations of the successive intervals might correspond to a Fibonacci sequence. In yet another embodiment, the calculated time interval may be based on the path cost between the two nodes. In a further embodiment, the time interval may be based on the frequency of switching by the node to alternate routes. For example, intervals can monotonically increase in length based on network conditions.

In summary, RIP metrics may be incremented at a varied rate during an AP's advertisement of its path to a node, to benefit from relatively short update intervals in the beginning of a registration period while minimizing problems associated with relatively long update intervals throughout the entire registration period. Other nodes can utilize these advertised metrics to select the most appropriate AP through which to connect to a desired node when more than one node advertises a path to the desired node. By selecting the AP with the lowest RIP metric in its advertisement, it is more likely that the AP with the most recent registration of the desired node will be chosen.

Likewise, when two or more nodes are concurrently advertising a path to a given endpoint with a static IP address, they can monitor each other's advertisements to determine which one contains the lowest RIP metric for that endpoint. All nodes other than the one with the lowest RIP metric can terminate their advertisements, to thereby decrease network traffic due to outdated registrations. Accordingly, the registration ambiguity associated with devices having static IP addresses in a network with multiple APs, such as DA devices in a utility network, may be avoided.

The above description is presented to enable a person skilled in the art to make and use the systems and methods described herein, and it is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of routing in a network, comprising:
   dividing a period of time, corresponding to registration of a first node with a second node, into a sequence of time intervals, wherein a time interval at the beginning said period of time has a duration that is shorter than a time interval that is later in said period of time;
   assigning to each of said time intervals a metric designating a cost associated with a communications path between the first node and the second node, wherein the designated cost increases in value for successive intervals of time in said sequence; and
   broadcasting, by the second node, at least one message during each of said time intervals, said message containing the metric associated with time interval during which the message is broadcast.

2. The method of claim 1, wherein said period of time is divided into a number n of first time increments at the beginning of said sequence and a number x of second time intervals at the end of said sequence, where n+x is equal to the total number, z, of intervals in said sequence, and wherein the first time intervals each have a predetermined duration and the second time increments each have a duration greater than the predetermined time interval of the first time increments n.

3. The method of claim 2, wherein each of the first time intervals has the same duration.

4. The method of claim 3, wherein each of the second time intervals has the same duration.

5. The method of claim 4, wherein the second time intervals each have a duration determined by ((said period of time)−(n*predetermined time))/(z−n).

6. The method of claim 1, wherein the durations of the time intervals increase successively over the sequence of time intervals.

7. The method of claim 6, wherein the durations of the time intervals increase in a non-linear manner.

8. The method of claim 1, wherein the first node is an Ethernet bridge to a utility device.

9. The method of claim 1, wherein the first node is a node in an ad-hoc utility wireless network.

10. The method of claim 1, wherein the second node is an Access Point of an ad-hoc utility wireless network.

11. The method of claim 1, wherein the second node is a node in an ad-hoc utility wireless network.

12. The method of claim 1, wherein the message containing the metric is a routing advertisement.

13. The method of claim 12, wherein the routing advertisement conforms to a distance-vector routing protocol.

14. The method of claim 13, wherein the distance-vector routing protocol is a Routing Information Protocol.

15. The method of claim 1, wherein the metric is a hop count.

16. The method of claim 1, wherein the network is a frequency-hopping spread spectrum network.

17. The method of claim 1, wherein said first node is associated with a device having a static IP address.

18. The method of claim 17, wherein said network employs dynamic address assignment to registered nodes.

19. A node for a communications network with devices having static internet protocol (IP) addresses with which second nodes register to provide a communications path, said node including a transmitting unit that broadcasts routing information messages via said communications network while a second node is registered with said node, wherein the routing information messages contain a metric value designating a cost associated with a communication path between said node and the second node, and configured to:
   divide a period of time, during which the second node is registered with said node into a sequence of time intervals, wherein a time interval at the beginning of said period of time has a duration that is shorter than a time interval that is later in said period of time;
   assign to each of said time intervals a metric value such that the designated cost increases in value for successive intervals of time in said sequence; and
   broadcast at least one routing information message during each of said time intervals, said message containing the metric value associated with time interval during which the message is broadcast.

20. The node of claim 19, wherein the durations of said time intervals conform to a step function, wherein each time interval in a first group of time intervals has a first duration, and time intervals in a second group of time intervals, which are later in said sequence, have a duration that is longer than said first duration.

21. The node of claim 19, wherein the durations of the time intervals increase successively over the sequence of time intervals.

22. The node of claim 21, wherein the durations of the time intervals increase in a non-linear manner.

23. The node of claim 19, wherein said node is an Access Point in an ad-hoc wireless utility network.

24. The node of claim 19, wherein said node is a node in an ad-hoc wireless utility network.

25. The node of claim 19, wherein the metric is a hop count.

26. The node of claim 19, wherein the network is a frequency-hopping spread spectrum network.

27. The node of claim 19, wherein said other node is associated with a device having a static IP address.

28. The node of claim 27, wherein said network employs dynamic address assignment to registered nodes.

29. The node of claim 19, wherein the durations of the time intervals increase monotonically between the beginning and end of said sequence of time intervals.

30. In a network in which a first node can register with two or more other nodes that provide access to and from said first node, a method comprising the following steps:
   at each other node with which the first node is registered, broadcasting advertisements that said other node can provide a path to the first node, said advertisements comprising messages that are transmitted during a sequence of time intervals over a period of time while the first node is registered, wherein a time interval earlier in said sequence has a duration that is shorter than a time interval that is later in said sequence, each said message containing a metric designating a cost associated with the path to the other node, and wherein the designated cost increases in value for successive intervals of time in said sequence;
   upon receiving an advertisement at one of said other nodes that another node can provide a path to said first node, determining whether the metric contained in the received advertisement designates a lower cost than the metric being broadcast by said one node for its path to the first node; and
   terminating the broadcast of the advertisements from said one node if the metric contained in the received advertisement designates a lower cost than the metric being broadcast by said one node.

31. The method of claim 30, wherein said first node comprises an endpoint in the network, and said other nodes comprise access points in the network.

32. The method of claim 30, wherein said first node has a static address, and said network employs dynamic addressing to access nodes in the network.

33. In a network in which a first node can register with two or more other nodes that provide access to and from said first node, a method comprising the following steps:
   at each other node with which the first node is registered, broadcasting advertisements that said other node can provide a path to the first node, said advertisements comprising messages that are transmitted during a sequence of time intervals over a period of time while the first node is registered, wherein a time interval earlier in said sequence has a duration that is shorter than a time interval that is later in said sequence, each said message containing a metric designating a cost associated with the path to the other node, and wherein the designated cost increases in value for successive intervals of time in said sequence;
   receiving said advertisements from two or more other nodes at a transmitting node, and selecting one of said other nodes based upon the respective metrics contained in the received advertisements; and
   transmitting a message to the first node from the transmitting node, via the selected one of said other nodes.

34. The method of claim 33, wherein said first node comprises an endpoint in the network, and said other nodes comprise access points in the network.

35. The method of claim 33, wherein said first node has a static address, and said network employs dynamic addressing to access nodes in the network.

* * * * *